US012504994B2

(12) United States Patent
Ghosh et al.

(10) Patent No.: US 12,504,994 B2
(45) Date of Patent: Dec. 23, 2025

(54) SUSTAINABILITY MODES IN A COMPUTING ENVIRONMENT

(71) Applicant: Dell Products L.P., Round Rock, TX (US)

(72) Inventors: Manav Ghosh, Bangalore (IN); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 568 days.

(21) Appl. No.: 17/970,090

(22) Filed: Oct. 20, 2022

(65) Prior Publication Data

US 2024/0134702 A1 Apr. 25, 2024
US 2024/0231933 A9 Jul. 11, 2024

(51) Int. Cl.
*G06F 9/50* (2006.01)
*G06F 9/445* (2018.01)

(52) U.S. Cl.
CPC .......... *G06F 9/505* (2013.01); *G06F 9/44505* (2013.01)

(58) Field of Classification Search
CPC ..................................................... G06F 9/505
See application file for complete search history.

(56) References Cited

U.S. PATENT DOCUMENTS

2015/0324220 A1* 11/2015 Bugenhagen ....... G06F 9/45533
  718/1
2020/0192708 A1* 6/2020 Wu ........................ G06F 16/285
2024/0403131 A1* 12/2024 Eker ....................... H04L 41/16

OTHER PUBLICATIONS

D. P. Acharya, "Green Coding: What Is It and Why Should You Care?" https://geekflare.com/green-coding/, Sep. 8, 2022, 12 pages.
R. Merritt, "What Is Green Computing?" https://blogs.nvidia.com/blog/2022/10/12/what-is-green-computing/#:~:text=Green%20computing%2C%20or%20sustainable%20computing,software%20are%20designed%20and%20used., Oct. 12, 2022, 24 pages.
Wikipedia, "Green Computing," https://en.wikipedia.org/wiki/Green_computing, Oct. 14, 2022, 19 pages.
E. Hustad et al., "Creating a Sustainable Digital Infrastructure: The Role of Service-Oriented Architecture," Procedia Computer Science, vol. 181, Jan. 2021, pp. 597-604.

* cited by examiner

*Primary Examiner* — Charlie Sun
(74) *Attorney, Agent, or Firm* — Ryan, Mason & Lewis, LLP

(57) ABSTRACT

Techniques are disclosed for managing workloads in data processing systems. For example, a method computes a set of sustainability modes for a computing environment, wherein each sustainability mode comprises respective configuration boundaries defining a different amount of resources that are available for executing one or more workloads in the computing environment.

20 Claims, 5 Drawing Sheets

SUSTAINABILITY MODES IN A COMPUTING ENVIRONMENT

FIELD

The field relates generally to information processing systems, and more particularly to workload management in such information processing systems.

BACKGROUND

Microservices are the predominant approach in the modern development of software (e.g., application programs, or more simply, applications) across a wide variety of computing platforms such as, but not limited to, a cloud computing platform, a private computing platform, a hybrid (cloud/private) computing platform, an edge computing platform, etc. A microservice architecture manages an application as a collection of services. As such, development of an application can be accomplished in a flexible and scalable manner. While microservices find utility in almost all areas today, irrespective of domain, the microservice architecture in the application topology consumes a major part of the technical focus.

Recently, sustainable software development has become an important technical focus and has thus become a major focus of global information technology (IT) enterprises. It is realized that the carbon footprint of the IT industry accounts for nearly three percent of global carbon dioxide emissions.

SUMMARY

Illustrative embodiments provide techniques for managing workloads in data processing systems.

For example, in an illustrative embodiment, a method computes a set of sustainability modes for a computing environment, wherein each sustainability mode comprises respective configuration boundaries defining a different amount of resources that are available for executing one or more workloads in the computing environment.

In further illustrative embodiments, the method may select one of the sustainability modes based on one or more selection criteria, and cause execution of the one or more workloads in the computing environment in the selected one of the set of sustainability modes.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

Advantageously, illustrative embodiments provide a plurality of sustainability modes that enable workloads/microservices to operate under different modes to control carbon emission and electricity consumption levels and automatically (or semi-automatically or manually) shift between the operation modes according to incoming requests (e.g., load and nature of outcome required) based on derived configuration and incoming traffic.

These and other illustrative embodiments include, without limitation, apparatus, systems, methods and computer program products comprising processor-readable storage media.

DETAILED DESCRIPTION

Figure 1:
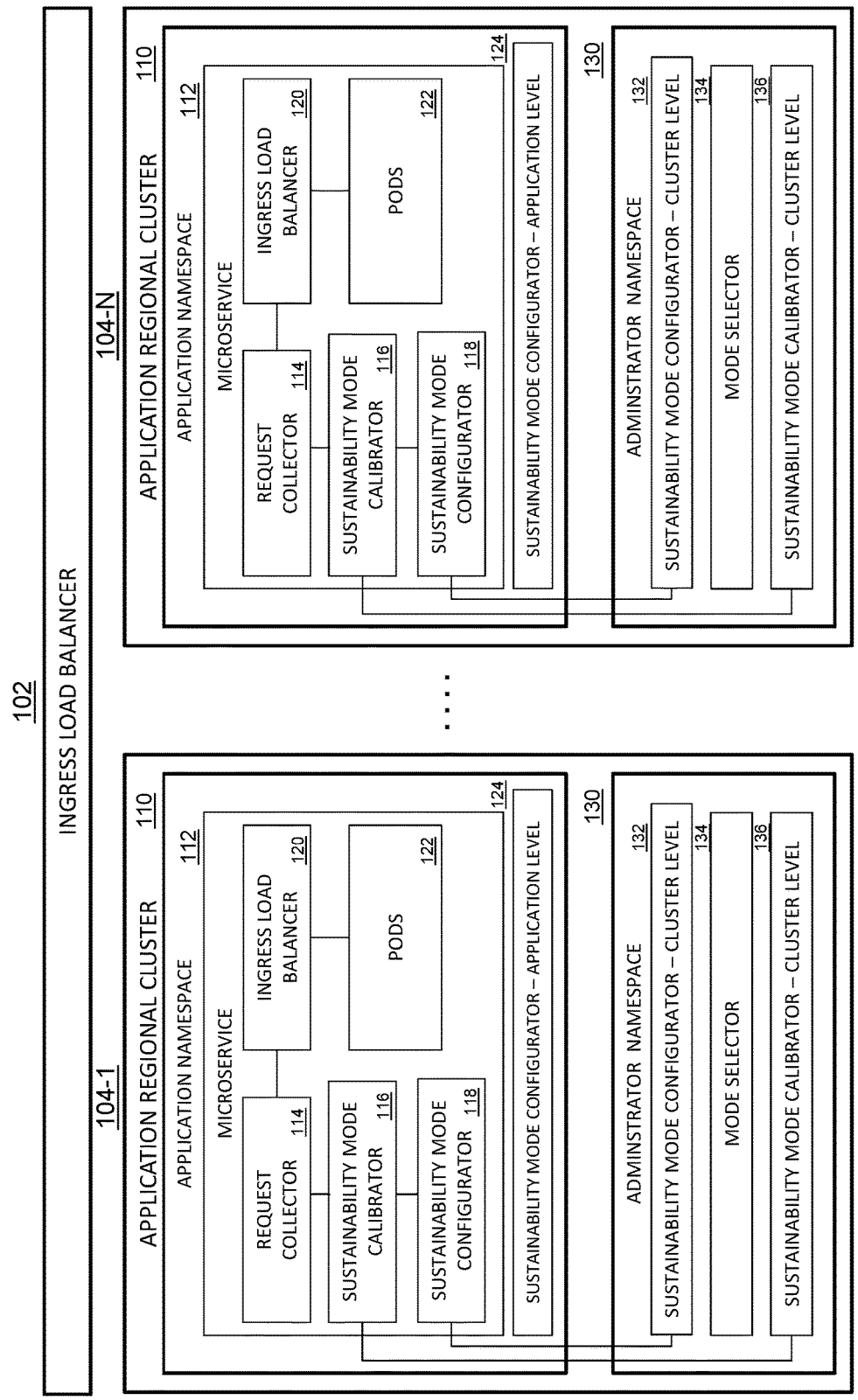
FIG. 1 illustrates a microservice computing environment with sustainability mode functionality according to an illustrative embodiment.

Sustainable software development is a mindset (principles) and an accompanying set of practices that enable a team to achieve and maintain an optimal development pace indefinitely. This led to green software engineering (green coding), which is an emerging discipline at the intersection of climate science, software practices and architecture, energy efficient product markets, hardware and data center design.

Even though there are many factors that influence sustainable development, main factors include: (i) carbon emission, e.g., striving for the lowest carbon emission by a workload (e.g., microservices/other software deployments); (ii) energy consumption, e.g., striving for the lowest energy consumption with the highest rate of utilization by a workload; and (iii) networking, e.g., striving for the lowest amount of data and distance travel for that data across a network.

Each software workload is intended to serve some specific job, which comes with a specific energy consumption and is subject to carbon emission. In current practice, some ways to reduce carbon emissions include: (i) reduce the number of servers; (ii) reduce the network hops between service calls as well as the distance each request and response travels; (iii) reduce the instances of different functions; (iv) replace scheduled jobs with event driven functions; and (v) minimize real time data streaming, i.e., compressing and decompressing data in transit.

Even though green coding is good for the environment, reducing the resource consumption can affect the reliability of the entire software product (whether it is a microservice or other workload), which is not desirable. Normally, in a practical scenario, current approaches try to design the infrastructure/coding/network to anticipate the highest load during a year. For example, for a technology enterprise selling to consumers, certain holidays will result in the highest load on the e-commerce computing platform of the enterprise. Thus, such enterprises typically deploy resources (e.g., compute, storage, network) to meet that highest load time period with a buffer. However, enterprises may maintain the deployment of the same resources at times of low loads. As a result, unfortunately, carbon emission will be almost the same throughout the year, irrespective of the load variation.

With respect to microservices, currently there are three ways to host a microservice:

(i) Bare metal hosting: In a bare metal hosting environment, there are no ways for horizontal scaling. When the system is under-utilized, energy efficiency is least since resources are over-allocated but under-utilized in terms of utilization rate.

(ii) Virtual machine (VM) hosting: In VM-based hosting, resource utilization is better than in a bare metal setup. Multiple services can be co-hosted on the same VM. Energy efficiency is better than bare metal, but horizontal scaling is still a challenge in VM-based hosting. Whenever a new instance of an application is needed a new VM is loaded which adds to carbon emissions since resource boundaries are not controlled.

(iii) Container hosting: In container hosting, resource utilization is maximum. Horizontal scaling can be achieved easily within the limits of the hardware resources. Energy efficiency is better than in VM-based hosting.

Even assuming that all microservices are being hosted on containers, this does not guarantee that it will always be energy efficient and have the highest rate of utilization. Central processing unit (CPU) utilization, memory utilization, Hypertext Transfer Protocol (HTTP) throughput (e.g., requests per second), HTTP latency (e.g., request response time in milliseconds) all contribute to factors of green software engineering. Thus, in spite of having the best hosting environment, applications and microservices cannot be considered as green because the amount of carbon they emit is not in sync with the rate of utilization. There is a significant amount of idle time in applications with multiple instances running where they are emitting carbon without serving any requests or performing any task.

Heavyweight libraries (e.g., logging frameworks, tracing frameworks, telemetry frameworks) which involve a significant amount of input/output (I/O) operations burn a significant amount of energy and consume more CPU, memory and I/O than the regular libraries, but are scarcely used because the applications have the least traffic during off-business hours. Multiple instances of applications are active thus consuming energy and, in turn, increasing carbon emission with minimal usage.

However, the load on a microservice is not the same throughout the day as it varies from high load to low load. A microservice need not be run at highest performance the entire day as the type of the request coming in may be different throughout the day. Some microservices are hit less at night and get the highest number of hits in the day peak hours (e.g., order booking service). Some other microservices will get the highest number of hits at night and the lowest hits in the daytime (e.g., a casino service). In some seasons, throughout the month, some microservices will get less hits while other seasons they will get the highest hits. There can be load variations in microservices within geographic regions as well.

Today, sustainable engineering and green coding is static for a given microservice. For example, existing approaches try to minimize energy consumption/carbon emission in different static ways: (i) reduce the number of deployed servers; (ii) reduce the number of deployed network resources; (iii) increase time laps in scheduled services; (iv) minimize database users; (v) minimize the maximum pod creation (in a Kubernetes container orchestration environment as will be further explained); and/or (vi) minimize the usage of additional clusters (in Kubernetes container orchestration environment). However, once deployed, the above approaches are static such that, in both high and low load conditions, the same resources run and burn almost same carbon footprint. These result in, inter alia, overuse of electricity and an increased carbon footprint in low load conditions, and fear of reliability of service in peak load conditions (e.g., limited resources may violate a quality of service (QoS) agreement).

Thus, such static sustainable engineering and green coding (code for least energy consuming or least carbon footprint) may impact the performance/resilience/behavior of microservices. So, in most of the critical microservices, a design/deployment team takes the maximum expected load (sometimes about 150% expected load for safety) and designs the system to attain least energy consumption in a static manner. The traffic in a day to the application and microservice can vary from low, medium to high. However, as the microservice deployment is designed for maximum capacity, the energy consumption for low/medium/high loads will be much the same.

For example, consider a microservice load distribution in a typical day in a US cluster:

8 AM-12 Noon—Average 1000 Simultaneous Requests
12 Noon-8 PM—Average 400 Simultaneous Requests
8 PM to 8 AM—Average 30 Simultaneous Requests When implementing existing green coding, a 1000-minimum simultaneous request boundary is maintained to optimize the clusters, network and implementation of the microservice. But, it is evident that this only be effective between 8 AM to 12 Noon. All other times, the resources are underutilized, while energy consumption is almost the same, as the same code base and other configurations are statically maintained. However, if a 400 simultaneous request boundary is used to optimize the microservice, the microservice will crash in the peak hours between 8 AM to 12 PM.

It is therefore realized herein that it would be advantageous for a software workload/microservice to self-adjust according to the load so as to use an appropriate (e.g., optimal) amount of resources in order to minimize carbon emission throughout the year. To do so, it is further realized that, according to the load, the computing platform would have to: (i) vary the amount of infrastructure used; (ii) vary the number of instances used; (iii) vary networking; and (iv) vary the logic in the coding.

Illustrative embodiments overcome the above and other drawbacks associated with conventional computing platforms by providing a plurality of sustainability modes that enable workloads/microservices to operate under different modes to control carbon emission and electricity consumption levels and automatically (or semi-automatically or manually) shift between the operation modes according to incoming requests (e.g., load and nature of outcome required) based on derived configuration and incoming traffic.

In one or more illustrative embodiments, sustainability modes for microservices comprise:

(i) Turbo mode which is defined as using a highest (e.g., maximum) amount of resources and consuming a highest amount of energy that gives a highest performance and resilience during a time window where the highest request load occurs;

(ii) Ecological (eco) mode which is defined as using a lowest amount (e.g., minimum) of resources and consuming a lowest amount of energy that gives a lowest performance and resilience during a time window where the lowest request load occurs (few or no requests); and (iii) Normal mode which is defined as using a medium (e.g., between maximum and minimum) amount of resources and consuming a medium amount of energy that gives a medium performance and resilience that supports a time window of a medium number of requests.

Further, one or more illustrative embodiments provide for shifting the microservice between these modes effectively based on one or more of: (i) the number of requests per a time window (e.g., one minute); (ii) the nature of the request; (iii) the geographic region; and (iv) enabled/disabled features based on usage and resource consumption.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing platforms comprising cloud and/or non-cloud computing and storage systems, as well as other types of processing systems comprising various combinations of physical and/or virtual processing resources. An information processing system may therefore comprise, by way of example only, at least one data center or other type of cloud-based system that includes one or more clouds hosting tenants that access cloud resources.

As the term is illustratively used herein, a container may be considered lightweight, stand-alone, executable software code that includes elements needed to run the software code. The container structure has many advantages including, but not limited to, isolating the software code from its surroundings, and helping reduce conflicts between different tenants or users running different software code on the same underlying infrastructure. The term "user" herein is intended to be broadly construed so as to encompass numerous arrangements of human, hardware, software or firmware entities, as well as combinations of such entities.

In illustrative embodiments, containers may be implemented using a Kubernetes container orchestration system. Kubernetes is an open-source system for automating application deployment, scaling, and management within a container-based information processing system comprised of components referred to as pods, nodes and clusters, as will be further explained below. Types of containers that may be implemented or otherwise adapted within the Kubernetes system include, but are not limited to, Docker containers or other types of Linux containers (LXCs) or Windows containers. Kubernetes has become the prevalent container orchestration system for managing containerized workloads. It is rapidly being adopted by many enterprise-based information technology (IT) organizations to deploy its application programs (applications). By way of example only, such applications may include stateless (or inherently redundant applications) and/or stateful applications. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster. A Kubernetes cluster is managed by a least one manager node. A Kubernetes environment may include multiple clusters respectively managed by multiple manager nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod.

FIG. 1 illustrates a microservice computing environment 100 with sustainability mode functionality according to an illustrative embodiment. As shown, microservice computing environment 100 comprises an ingress load balancer 102 operatively coupled to a plurality of application regional clusters 104-1, . . . , 104-N (herein each individually referred to as application regional cluster 104 or collectively as application regional clusters 104). Ingress load balancer 102 receives requests to microservice computing environment 100 and then distributes them to one or more of application regional clusters 104 based on one or more standard load balancing criteria.

In this illustrative embodiment, each application regional cluster 104 is similarly configured and comprises an application namespace 110 and am administrator namespace 130. Application namespace 110 comprise a microservice 112 which itself comprises a request collector 114, a sustainability mode calibrator 116, a sustainability mode configurator 118, an ingress load balancer 120, and a set of one or more pods 122 running the workload(s) of microservice 112. Requests are distributed to one or more pods 122 by ingress load balancer 120 based on one or more standard load balancing criteria. Application namespace 110 also comprises a sustainability mode configurator—application level 124. Administrator namespace 130 comprises a sustainability mode configurator—cluster level 132 operatively coupled to sustainability mode configurator 118, a mode selector 134, and a sustainability mode calibrator—cluster level 136 operatively coupled to sustainability mode calibrator 116.

Since each application regional cluster 104 is similarly configured, the description below will refer to a single one of application regional clusters 104 but is understood to apply to each application regional cluster 104.

It is to be appreciated that in addition to the sustainability modes mentioned herein (e.g., turbo, eco, normal), application regional cluster 104 is configured to selectively operate in a calibration mode or a run mode. In calibration mode, an initial turbo mode is run and collects the incoming requests' variations in production against time. By running microservice 112, it is meant that one or more pod-based workloads/services associated with microservice 112 are executed in response to the incoming requests.

The sustainability mode boundaries are calibrated for microservice 112. Once calibrated, a sustainability mode configuration is set, e.g., as follows:
    a. 10 AM to 12 PM→Turbo, 12 PM to 8 PM→Normal, 8 PM to 10 AM→Eco
    b. 0-10 Simultaneous Request→Eco. 10-50 Simultaneous Request→Normal,
       Above 50 Simultaneous Requests→Turbo Then, in run mode, application regional cluster 104 runs the above sustainability mode configuration and automatically shifts the sustainability mode according to the incoming requests and configuration.

It is to be further appreciated that the sustainability mode configuration can be set and executed in one of two illustrative implementations: (i) a targeted microservice as a side car implementation (side cars are containers that run in the one or more pods 122 that perform functions in conjunction with containers in the one or more pods 122 that run microservice 112); and (ii) a sustainability administrator namespace implementation (administrator namespace 130). These two illustrative implementations will now be described. However, it is to be appreciated that alternative implementations are contemplated in alternative embodiments.

In a targeted microservice as a side car implementation, microservice 112 is responsible for collecting the requests (request collector 114) for calibration and calibrating load (sustainability mode calibrator 116) for configuring the different sustainability modes (sustainability mode configurator 118).

More particularly, in a microservice side car implementation, request collector 114 collects the requests and passes them to the administrator namespace 130 for the calibration and sustainability mode selection. Sustainability mode calibrator 116 operates in one of two modes: the calibration mode; or the run mode.

In the calibration mode, microservice 112 runs in turbo mode and takes requests and passes them to the sustainability mode calibrator—cluster level 136 to calibrate for a given time period (e.g., one month) and to compute different sustainability mode boundary values, as well as to enable a user to apply the suggested boundary values.

In run mode, microservice 112 monitors mode selector 134 for instructions to shift sustainability modes from or to turbo, normal and eco mode. Sustainability mode configurator—application level 124 maintains the configuration of boundary conditions of the different sustainability modes, which are set after the calibration is done. Mode selector 134 uses this configuration to automatically shift the sustainability modes, which can be manually overridden by an administrator via mode selector 134. A combination of automatic selection and manual selection is considered semi-automatic selection.

In a sustainability administrator namespace implementation, administrator namespace 130 derives the boundary conditions for the different sustainability modes at a cluster level according to server/cluster resource availability (sustainability mode calibrator—cluster level 136), maintains the boundary conditions for the different sustainability modes (sustainability mode configurator—cluster level 132), and executes an automatic, manual, or semi-automatic mode selection (mode selector 134). More particularly, when calibration is done at the microservice level, the result is passed to administrator namespace 130 where the load in the calibration mode is compared with the actual memory and CPU usage of the cluster. Then, administrator namespace 130 sets the boundary conditions based on the number of requests and time duration. This can be overridden or accepted by an administrator.

Figure 2A:
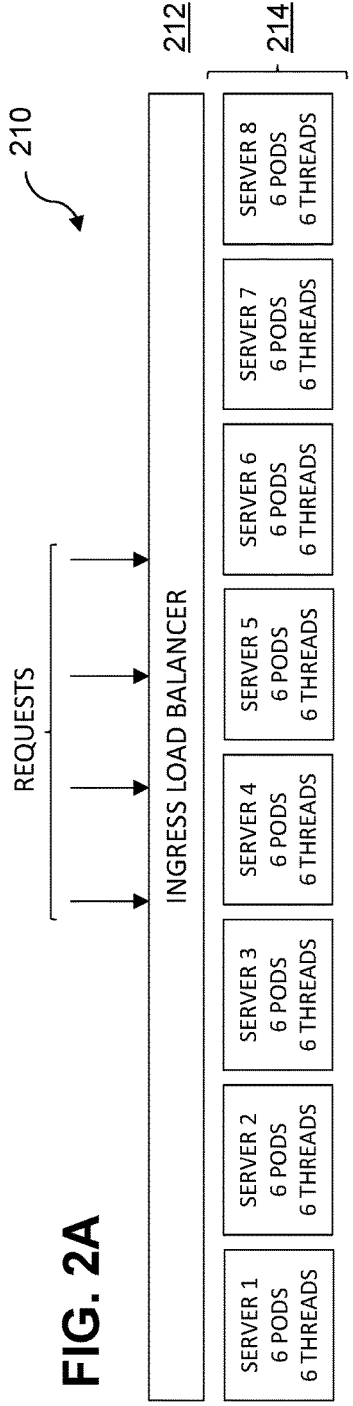
FIGS. 2A-2C illustrate sustainability modes according to an illustrative embodiment.
Figure 2B:
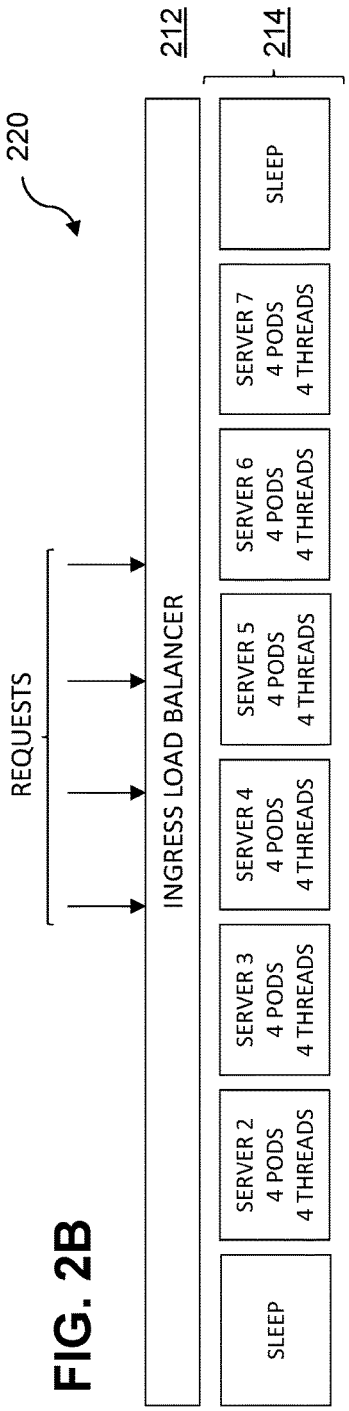
Figure 2C:
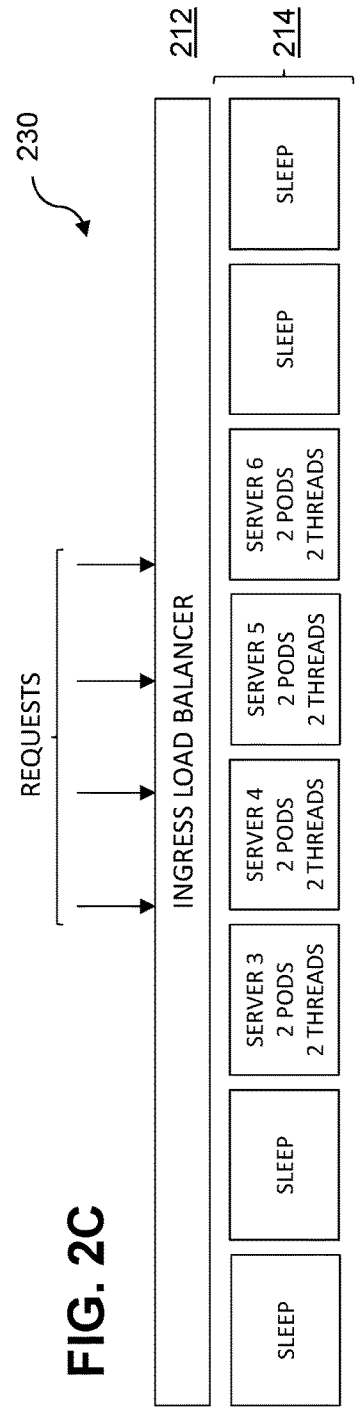

It is realized that different applications behave differently. So, the different sustainability modes can be achieved in different ways. FIGS. 2A-2C illustrate sustainability modes according to an illustrative embodiment. Assume a microservice or a choreography of microservices performs an operation of loading telemetry data from different customer servers for analytics. Assume the microservice computing environment comprises two data centers and four servers/clusters in each data center. Thus, there are eight servers/clusters across the two data centers (i.e., set of servers 214). A load balancer (i.e., ingress load balancer 212) on top of the data centers diverts the load to different servers/clusters as mentioned above. By default, assume that pod replication is set to six, meaning there is a minimum of six pods running at a time. Assume further that, at the coding level, there is code branching which can be configured as two threads, four threads and six threads. In turbo mode, all eight servers, each with six pods and six threads, are run at max capacity. Assume that the following sustainability mode configuration is set:

Turbo mode: 8 servers, 6 pods, 6 threads (210 in FIG. 2A);
Normal mode: 6 servers, 4 pods, 4 threads (220 in FIG. 2B);
Eco mode: 4 servers, 2 pods, 2 threads (230 in FIG. 2C).

In calibration mode, the system (e.g., application regional cluster 104) starts recording the input load and memory and CPU consumption. The system records the load in each server/cluster and the resources utilized. Assume, for example, it is showing a peak average 52% of memory and 56% of CPU (between 9 AM and 6 PM) and in low hours (6 PM to 9 AM) 12% of memory and 16% of CPU.

The system can then extrapolate (using a conventional historical based forecasting algorithm) for the seasonal peak hours (e.g., Black Friday in an e-commerce application) where it may grow to an average of 70% of memory and 73% of CPU. The system may need to run in turbo mode at those critical times.

So, with this data in the normal capacity, the system does not need eight servers. Thus, the system recalibrates for six servers where two servers are placed into a sleep mode (i.e., they are offline but stand ready to be dynamically brought back online when needed). As illustrated in FIG. 2B, six servers each run with four pods and four threads.

Assume now the system is showing a peak average of 62% of memory and 66% of CPU (between 9 AM and 6 PM) and in low hours (6 PM to 9 AM) 32% of memory and 36% of CPU.

Accordingly, it is evident that the application can run safely in normal mode during the day (between 9 AM and 6 PM) and eco mode in the nighttime (6 PM to 9 AM). As such, the system automatically configures as follows:

All months—9 AM to 6 PM—Normal Mode (6 servers, 4 pods, 4 threads);
All Months—6 PM to 9 AM—Eco Mode (4 servers, 2 pods, 2 threads); and
October to January—Turbo Mode, based on the historical forecast of load (8 servers, 6 pods, 6 threads).

Thus, two servers are disabled (this can be accomplished in ingress load balancer 212) and kept in sleep mode in normal months. The system is then automatically configured for four pods and the code customized to run four threads as default in the normal mode (220 in FIG. 2B).

At 6 PM, the system triggers the configuration changes to block incoming requests for two more servers and updates configuration to default to a pod replication of two and thread default to two in the eco mode (230 in FIG. 2C).

Then, on October $1^{st}$ at 12 AM, all servers are injected back to the load balancer and default pod replication goes to six with a six-thread default in the turbo mode (210 in FIG. 2A).

Note that, in an e-commerce application-based microservice, an administrator can manually move into turbo mode in September for safety and so as to avoid any later glitches in Black Friday sales.

In run mode, the system automatically shifts sustainability modes based on day and time which saves electrical energy consumption and reduces the carbon footprint in the nighttime.

Advantageously, as explained herein, illustrative embodiments enable shifting between sustainability modes (e.g., turbo, eco, normal) in a run mode based on configuration boundaries and incoming traffic, as well as a calibration mode where the sustainability modes are derived for microservices on a production system.

Figure 3:
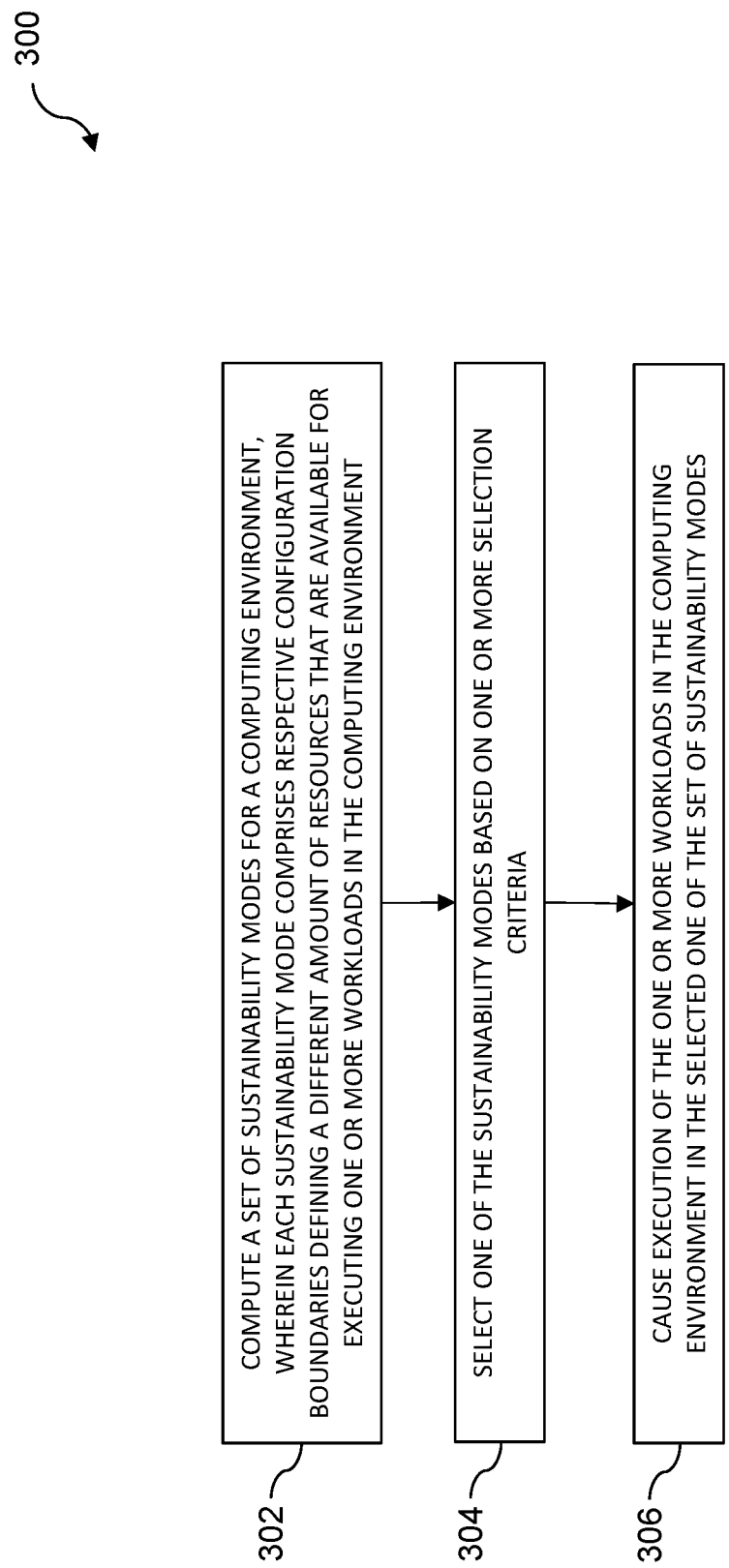
FIG. 3 illustrates a microservice computing methodology with sustainability mode functionality according to an illustrative embodiment.

FIG. 3 illustrates a methodology 300 according to an illustrative embodiment. It is to be understood that, in illustrative embodiments, methodology 300 is performed by microservice computing environment 100 of FIG. 1.

As shown, step 302 computes a set of sustainability modes for a computing environment, wherein each sustainability mode comprises respective configuration boundaries defining a different amount of resources that are available for executing one or more workloads in the computing environment. Step 304 selects one of the sustainability modes based on one or more selection criteria. Step 306 causes execution of the one or more workloads in the computing environment in the selected one of the set of sustainability modes.

The particular processing operations and other system functionality described in conjunction with the diagrams described herein are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for ring architecture-based workload management in a microservice computing environment will now be described in greater detail with reference to FIGS. 4 and 5. Although described in the context of systems/module/processes of FIGS. 1-3, these platforms may also be used to implement at least portions of other information processing systems in other embodiments.

Figure 4:
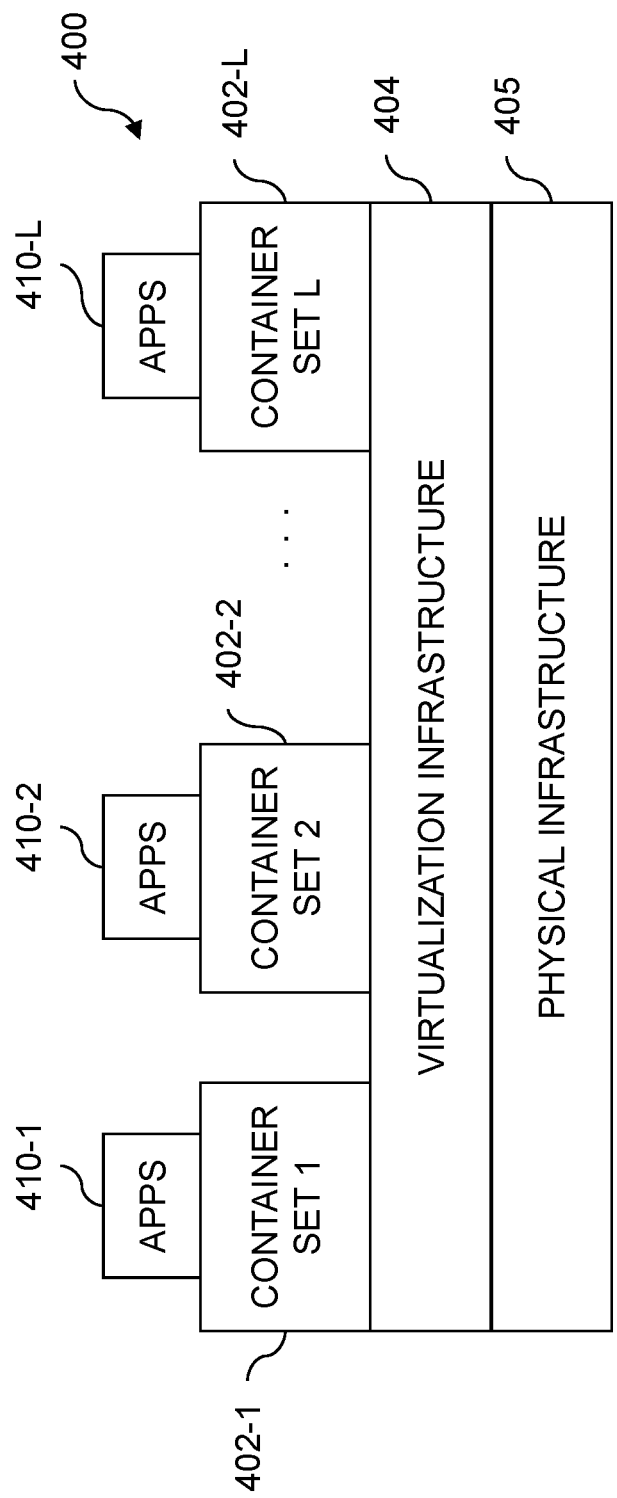
FIGS. 4 and 5 illustrate examples of processing platforms that may be utilized to implement at least a portion of an information processing system with sustainability mode functionality according to one or more illustrative embodiments.
Figure 5:
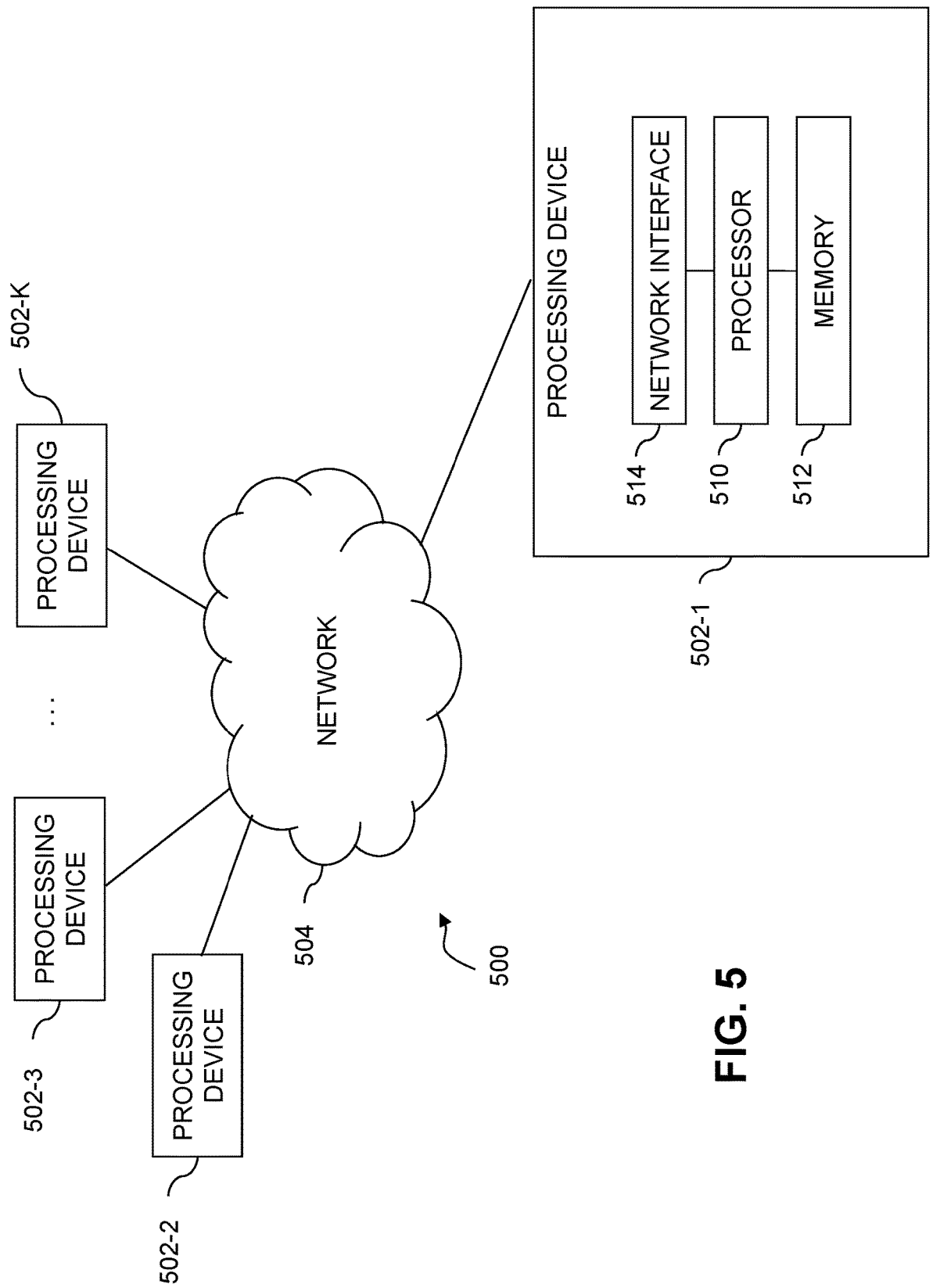

FIG. 4 shows an example processing platform comprising cloud infrastructure 400. The cloud infrastructure 400 comprises a combination of physical and virtual processing resources that may be utilized to implement at least a portion of microservice computing environment 100. The cloud infrastructure 400 comprises multiple container sets 402-1, 402-2, . . . 402-L implemented using virtualization infrastructure 404. The virtualization infrastructure 404 runs on physical infrastructure 405, and illustratively comprises one or more hypervisors and/or operating system level virtualization infrastructure.

The cloud infrastructure 400 further comprises sets of applications 410-1, 410-2, . . . 410-L running on respective ones of the container sets 402-1, 402-2, . . . 402-L under the control of the virtualization infrastructure 404. The container sets 402 may comprise respective sets of one or more containers.

In some implementations of the FIG. 4 embodiment, the container sets 402 comprise respective containers implemented using virtualization infrastructure 404 that provides operating system level virtualization functionality, such as support for Kubernetes-managed containers.

As is apparent from the above, one or more of the processing modules or other components of microservice computing environment 100 may each run on a computer, server, storage device or other processing platform element. A given such element may be viewed as an example of what is more generally referred to herein as a "processing device." The cloud infrastructure 400 shown in FIG. 4 may represent at least a portion of one processing platform. Another example of such a processing platform is processing platform 500 shown in FIG. 5.

The processing platform 500 in this embodiment comprises a portion of microservice computing environment 100 and includes a plurality of processing devices, denoted 502-1, 502-2, 502-3, . . . 502-K, which communicate with one another over a network 504.

The network 504 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 502-1 in the processing platform 500 comprises a processor 510 coupled to a memory 512.

The processor 510 may comprise a microprocessor, a microcontroller, an application-specific integrated circuit (ASIC), a field-programmable gate array (FPGA) or other type of processing circuitry, as well as portions or combinations of such circuitry elements.

The memory 512 may comprise random access memory (RAM), read-only memory (ROM), flash memory or other types of memory, in any combination. The memory 512 and other memories disclosed herein should be viewed as illustrative examples of what are more generally referred to as "processor-readable storage media" storing executable program code of one or more software programs.

Articles of manufacture or computer program products comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 502-1 is network interface circuitry 514, which is used to interface the processing device with the network 504 and other system components, and may comprise conventional transceivers.

The other processing devices 502 of the processing platform 500 are assumed to be configured in a manner similar to that shown for processing device 502-1 in the figure.

Again, the particular processing platform 500 shown in the figure is presented by way of example only, and systems/modules/processes of FIGS. 1-3 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality as disclosed herein are illustratively implemented in the form of software running on one or more processing devices.

In some embodiments, storage systems may comprise at least one storage array implemented as a Unity, PowerMax, PowerFlex (previously ScaleIO) or PowerStore storage array, commercially available from Dell Technologies. As another example, storage arrays may comprise respective clustered storage systems, each including a plurality of storage nodes interconnected by one or more networks. An example of a clustered storage system of this type is an XtremIO™ storage array from Dell Technologies, illustratively implemented in the form of a scale-out all-flash content addressable storage array.

It should again be emphasized that the above-described embodiments are presented for purposes of illustration only. Many variations and other alternative embodiments may be used. For example, the disclosed techniques are applicable to a wide variety of other types of information processing systems, host devices, storage systems, container monitoring tools, container management or orchestration systems, container metrics, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing platform comprising at least one processor coupled to at least one memory, the at least one processing platform, when executing program code, is configured to:
compute a set of sustainability modes for a computing environment, wherein each sustainability mode comprises respective configuration boundaries defining a different amount of resources that are available for executing one or more workloads in the computing environment, and wherein the computing of the set of sustainability modes for the computing environment further comprises executing a calibration operation with respect to the computing environment for an incoming set of requests.

2. The apparatus of claim 1, wherein the at least one processing platform, when executing program code, is further configured to cause execution of the one or more workloads in the computing environment in one of the set of sustainability modes.

3. The apparatus of claim 2, wherein the at least one processing platform, when executing program code, is further configured to select one of the sustainability modes based on one or more selection criteria.

4. The apparatus of claim 3, wherein selection comprises one or more of an automatic selection, a semi-automatic selection, and a manual selection.

5. The apparatus of claim 1, wherein the set of sustainability modes comprises:

a first sustainability mode with configuration boundaries defining a first amount of resources that are available for executing the one or more workloads in the computing environment;
a second sustainability mode with configuration boundaries defining a second amount of resources that are available for executing the one or more workloads in the computing environment, wherein the second amount of resources is less than the first amount of resources; and
a third sustainability mode with configuration boundaries defining a third amount of resources that are available for executing the one or more workloads in the computing environment, wherein the third amount of resources is between the first amount of resources and the second amount of resources.

6. The apparatus of claim 1, wherein the calibration operation is configured to:
set the amount of resources to a maximum amount of resources available for executing the one or more workloads in the computing environment;
measure resource consumption at different time ranges of a given time period of execution of the one or more workloads in the computing environment; and
determine configuration boundaries for each of the sustainability modes based on the measured resource consumption.

7. The apparatus of claim 1, wherein the computing environment comprises a container orchestration system.

8. The apparatus of claim 7, wherein the resources that are available for executing the one or more workloads in the computing environment comprise servers, pods, and threads.

9. The apparatus of claim 1, wherein in the one or more workloads are associated with an application program configured as a microservice.

10. The apparatus of claim 1, wherein the at least one processing platform, when executing program code, is further configured to shift between the set of sustainability modes for the computing environment and a calibration mode to execute the calibration operation.

11. A method comprising:
computing a set of sustainability modes for a computing environment, wherein each sustainability mode comprises respective configuration boundaries defining a different amount of resources that are available for executing one or more workloads in the computing environment, and wherein the computing of the set of sustainability modes for the computing environment further comprises executing a calibration operation with respect to the computing environment for an incoming set of requests;
wherein the computing is performed by a processing platform comprising at least one processor, coupled to at least one memory, executing program code.

12. The method of claim 11, further comprising causing execution of the one or more workloads in the computing environment in one of the set of sustainability modes.

13. The method of claim 12, further comprising selecting one of the sustainability modes based on one or more selection criteria.

14. The method of claim 13, wherein selection comprises one or more of an automatic selection, a semi-automatic selection, and a manual selection.

15. The method of claim 11, wherein the set of sustainability modes comprises:

a first sustainability mode with configuration boundaries defining a first amount of resources that are available for executing the one or more workloads in the computing environment;

a second sustainability mode with configuration boundaries defining a second amount of resources that are available for executing the one or more workloads in the computing environment, wherein the second amount of resources is less than the first amount of resources; and a third sustainability mode with configuration boundaries defining a third amount of resources that are available for executing the one or more workloads in the computing environment, wherein the third amount of resources is between the first amount of resources and the second amount of resources.

16. The method of claim 11, wherein the calibration operation is configured to:

set the amount of resources to a maximum amount of resources available for executing the one or more workloads in the computing environment;

measure resource consumption at different time ranges of a given time period of execution of the one or more workloads in the computing environment; and determine configuration boundaries for each of the sustainability modes based on the measured resource consumption.

17. The method of claim 11, further comprising shifting between the set of sustainability modes for the computing environment and a calibration mode to execute the calibration operation.

18. A computer program product comprising a non-transitory processor-readable storage medium having stored therein program code of one or more software programs, wherein the program code when executed by at least one processing platform causes the at least one processing platform to:

compute a set of sustainability modes for a computing environment, wherein each sustainability mode comprises respective configuration boundaries defining a different amount of resources that are available for executing one or more workloads in the computing environment, and wherein the computing of the set of sustainability modes for the computing environment further comprises executing a calibration operation with respect to the computing environment for an incoming set of requests.

19. The computer program product of claim 18, further comprising causing execution of the one or more workloads in the computing environment in one of the set of sustainability modes.

20. The computer program product of claim 18, wherein the set of sustainability modes comprises:

a first sustainability mode with configuration boundaries defining a first amount of resources that are available for executing the one or more workloads in the computing environment;

a second sustainability mode with configuration boundaries defining a second amount of resources that are available for executing the one or more workloads in the computing environment, wherein the second amount of resources is less than the first amount of resources; and a third sustainability mode with configuration boundaries defining a third amount of resources that are available for executing the one or more workloads in the computing environment, wherein the third amount of resources is between the first amount of resources and the second amount of resources.

\* \* \* \* \*